US012790156B2

(12) United States Patent
Suzuki et al.

(10) Patent No.: US 12,790,156 B2

(45) **Date of Patent: *Nov. 10, 2026**

(54) SHEET SUPPLYING APPARATUS AND PRINTING APPARATUS

(71) Applicant: CANON KABUSHIKI KAISHA, Tokyo (JP)

(72) Inventors: Tomohiro Suzuki, Kawasaki (JP); Masashi Kamada, Kawasaki (JP); Masato Eiyama, Yokohama (JP); Yuki Igarashi, Tokyo (JP); Masashi Negishi, Kawasaki (JP); Ryoya Shinjo, Kawasaki (JP); Ryo Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 110 days.

This patent is subject to a terminal disclaimer.

(21) Appl. No.: 18/756,279

(22) Filed: Jun. 27, 2024

(65) Prior Publication Data

US 2024/0343517 A1 Oct. 17, 2024

Related U.S. Application Data

(60) Continuation of application No. 18/096,826, filed on Jan. 13, 2023, now Pat. No. 12,049,374, which is a (Continued)

(30) Foreign Application Priority Data

Mar. 10, 2017 (JP) ................................. 2017-046418

(51) Int. Cl.

*B65H 23/04* (2006.01)
*B41J 11/00* (2006.01)
(Continued)

(52) U.S. Cl.

CPC ........ *B65H 23/042* (2013.01); *B41J 11/0045* (2013.01); *B41J 11/0095* (2013.01); (Continued)

(58) Field of Classification Search

None
See application file for complete search history.

(56) References Cited

U.S. PATENT DOCUMENTS

| | | | |
|---|---|---|---|
| 9,334,137 | B2 | 5/2016 | Igarashi et al. |
| 9,539,831 | B2 | 1/2017 | Tanami et al. |

(Continued)

FOREIGN PATENT DOCUMENTS

| | | | |
|---|---|---|---|
| JP | 08-133534 | A | 5/1996 |
| JP | 2000-169013 | A | 6/2000 |
| JP | 2011-037557 | A | 2/2011 |

OTHER PUBLICATIONS

English translation of Japanese Laid-open Patent Application No. 2000-169013.

(Continued)

*Primary Examiner* — William A. Rivera
(74) *Attorney, Agent, or Firm* — Venable LLP

(57) ABSTRACT

A sheet supplying apparatus, which is capable of winding a sheet tightly, includes a driving unit configured to cause a roll including a wound consecutive sheet to rotate in a first direction for feeding the sheet or a second direction opposite to the first direction, a sensor that detects a leading end portion of the sheet separated from an outer circumferential surface of the roll, and a contact body that presses the outer circumferential surface. Before the sheet is fed, in a state in which the contact body presses the outer circumferential surface, the driving unit causes the roll to continuously (Continued)

rotate in the second direction until a detection cycle of the leading end portion by the sensor is less than a predetermined value.

12 Claims, 11 Drawing Sheets

Related U.S. Application Data continuation of application No. 17/069,183, filed on Oct. 13, 2020, now Pat. No. 11,577,927, which is a division of application No. 15/910,489, filed on Mar. 2, 2018, now Pat. No. 10,829,329.

(51) Int. Cl.

| | |
|---|---|
| ***B41J 11/02*** | (2006.01) |
| ***B41J 11/66*** | (2006.01) |
| ***B65H 16/10*** | (2006.01) |
| ***B65H 20/02*** | (2006.01) |
| ***B65H 23/182*** | (2006.01) |

(52) U.S. Cl.

CPC ................ *B41J 11/02* (2013.01); *B41J 11/66* (2013.01); *B65H 16/106* (2013.01); *B65H 20/02* (2013.01); *B65H 23/1825* (2013.01); *B65H 2301/522* (2013.01); *B65H 2403/942* (2013.01); *B65H 2701/1311* (2013.01)

(56) References Cited

U.S. PATENT DOCUMENTS

| | | | | |
|---|---|---|---|---|
| 9,579,907 | B2 | 2/2017 | Shinjo et al. | |
| 9,592,683 | B2 | 3/2017 | Kobayashi et al. | |
| 10,421,299 | B2 | 9/2019 | Daikoku et al. | |
| 10,427,431 | B2 | 10/2019 | Masuda et al. | |
| 10,597,247 | B2 | 3/2020 | Eiyama et al. | |
| 10,703,117 | B2 | 7/2020 | Eiyama et al. | |
| 10,766,279 | B2 | 9/2020 | Yasuda et al. | |
| 10,829,329 | B2 * | 11/2020 | Suzuki | B41J 11/0095 |
| 11,577,927 | B2 * | 2/2023 | Suzuki | B65H 23/042 |
| 12,049,374 | B2 * | 7/2024 | Suzuki | B41J 11/66 |
| 2006/0157526 | A1 | 7/2006 | Shiraishi et al. | |
| 2010/0238225 | A1 | 9/2010 | Igarashi et al. | |
| 2012/0026265 | A1 | 2/2012 | Kawashima | |
| 2013/0213577 | A1 | 8/2013 | Matsumoto et al. | |
| 2015/0328906 | A1 | 11/2015 | Sumioka et al. | |
| 2016/0136981 | A1 | 5/2016 | Suzuki et al. | |
| 2016/0207333 | A1 | 7/2016 | Igarashi et al. | |
| 2017/0120636 | A1 | 5/2017 | Kobayashi et al. | |

OTHER PUBLICATIONS

Office Action dated Jan. 28, 2020, in Japanese Patent Application No. 2017-046418.

* cited by examiner

SHEET SUPPLYING APPARATUS AND PRINTING APPARATUS

BACKGROUND OF THE INVENTION

Field of the Invention

The present invention relates to a sheet supplying apparatus and a printing apparatus which are capable of pulling a sheet out of a roll on which a continuous sheet is wound and supplying the sheet.

Description of the Related Art

A printing apparatus that detects a sheet leading end of an installed roll sheet (hereinafter also referred to simply as a "roll") and automatically feeds the sheet is disclosed in Japanese Patent Laid-Open No. 2011-37557. In this apparatus, the sheet leading end is detected through an optical sensor while causing the roll to rotate in a winding direction opposite to a supply direction, and when the detection is completed, the roll is caused to rotate in the supply direction, and the sheet separated from the roll (hereinafter also referred to as "peeling") is fed to the inside of the apparatus.

SUMMARY OF THE INVENTION

In a case in which the roll set in a sheet supplying apparatus is not tightly wound, the automatic sheet feeding may not work smoothly since the roll is loose. Depending on a type of sheet, only by removing packing of a new roll, the roll which is tightly wound becomes loose, and the diameter of the roll expands. Therefore, the user should check that the roll to be set is not loose and then work carefully so that the roll does not become loose even when the roll is set in the apparatus. Any means for solving such a problem is not disclosed in Japanese Patent Laid-Open No. 2011-37557.

It is an object of the present invention to provide a sheet supplying apparatus and a printing apparatus which are capable of winding the roll set by a user tightly.

A sheet supplying apparatus according to the present invention includes a driving unit configured to cause a roll including a wound consecutive sheet to rotate in a first direction for feeding the sheet or a second direction opposite to the first direction, a sensor that detects a leading end portion of the sheet separated from an outer circumferential surface of the roll, and a contact body that presses the outer circumferential surface, in which, before the sheet is fed, in a state in which the contact body presses the outer circumferential surface, the driving unit causes the roll to continuously rotate in the second direction until a detection cycle of the leading end portion by the sensor is smaller than a predetermined value.

Further features of the present invention will become apparent from the following description of exemplary embodiments with reference to the attached drawings.

DESCRIPTION OF THE EMBODIMENTS

Figure 1:
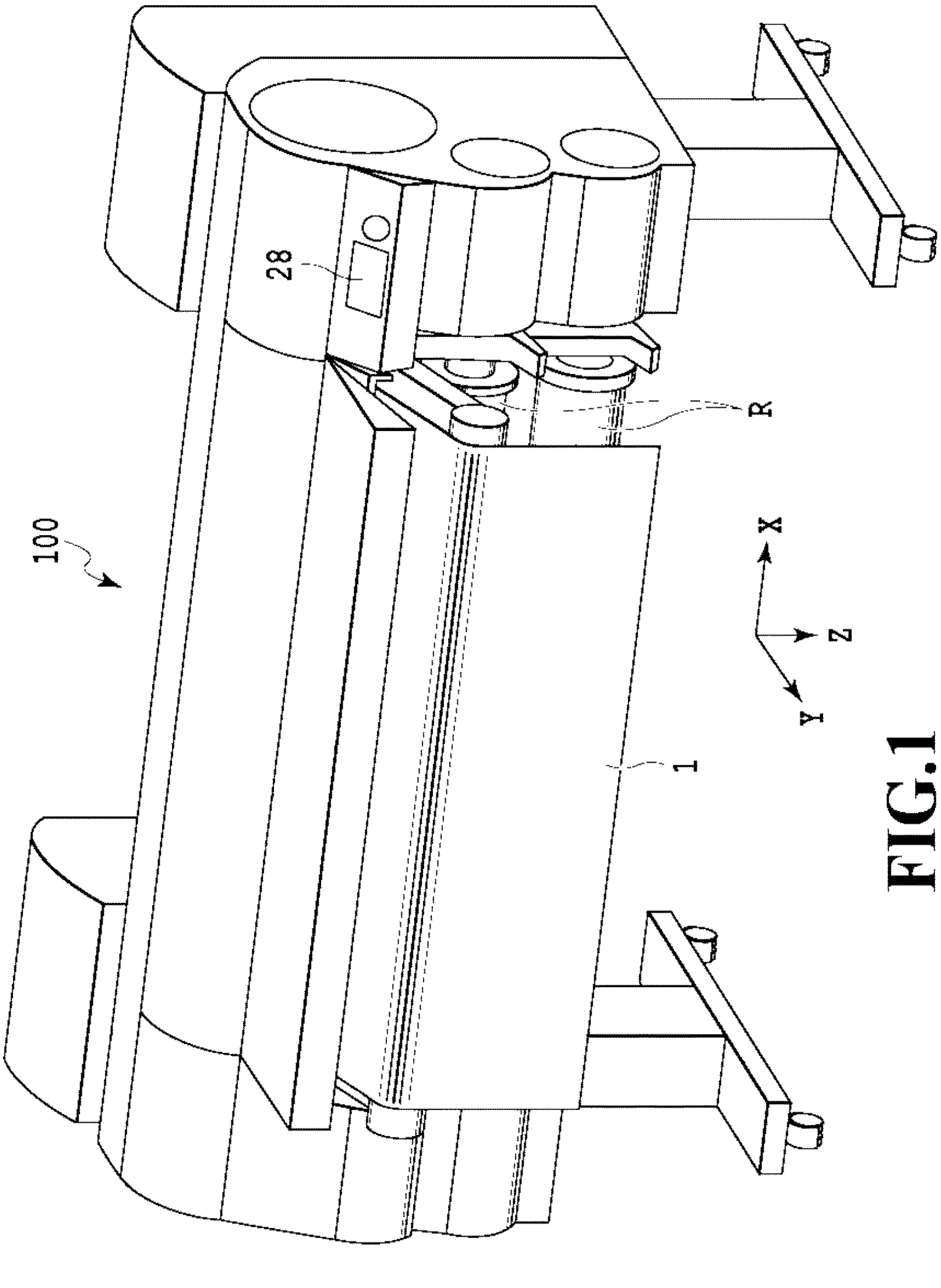
FIG. 1 is a perspective view of a printing apparatus according to an embodiment of the present invention.

Hereinafter, exemplary embodiments of the present invention will be described with reference to the appended drawings. First, a basic composition of the present invention will be described.

<Basic Configuration>

FIGS. 1 to 5 are explanatory diagrams of a basic configuration of a printing apparatus according to an embodiment of the present invention. A printing apparatus of the present example is an inkjet printing apparatus including a sheet supplying apparatus that supplies a sheet serving as a print medium and a printing unit that prints an image on the sheet. For the sake of description, coordinate axes are set as illustrated in the drawings. In other words, a sheet width direction of a roll R is set as an X-axis direction, a direction in which the sheet is conveyed in a printing unit 400 to be described later is set as a Y-axis direction, and a gravity direction is set as a Z-axis direction.

As illustrated in FIG. 1, in a printing apparatus 100 of the present example, the roll R (roll sheet) obtained by winding a sheet 1 which is a long continuous sheet (also referred to as a web) in a roll form can be set in each of two upper and lower roll holding units. An image is printed on the sheet 1 selectively pulled out of the rolls R. A user can input, for example, various commands to the printing apparatus 100 such as a command of designating a size of the sheet 1 or a command of performing switching between on-line and off-line using various switches installed in a manipulation panel 28.

Figure 2:
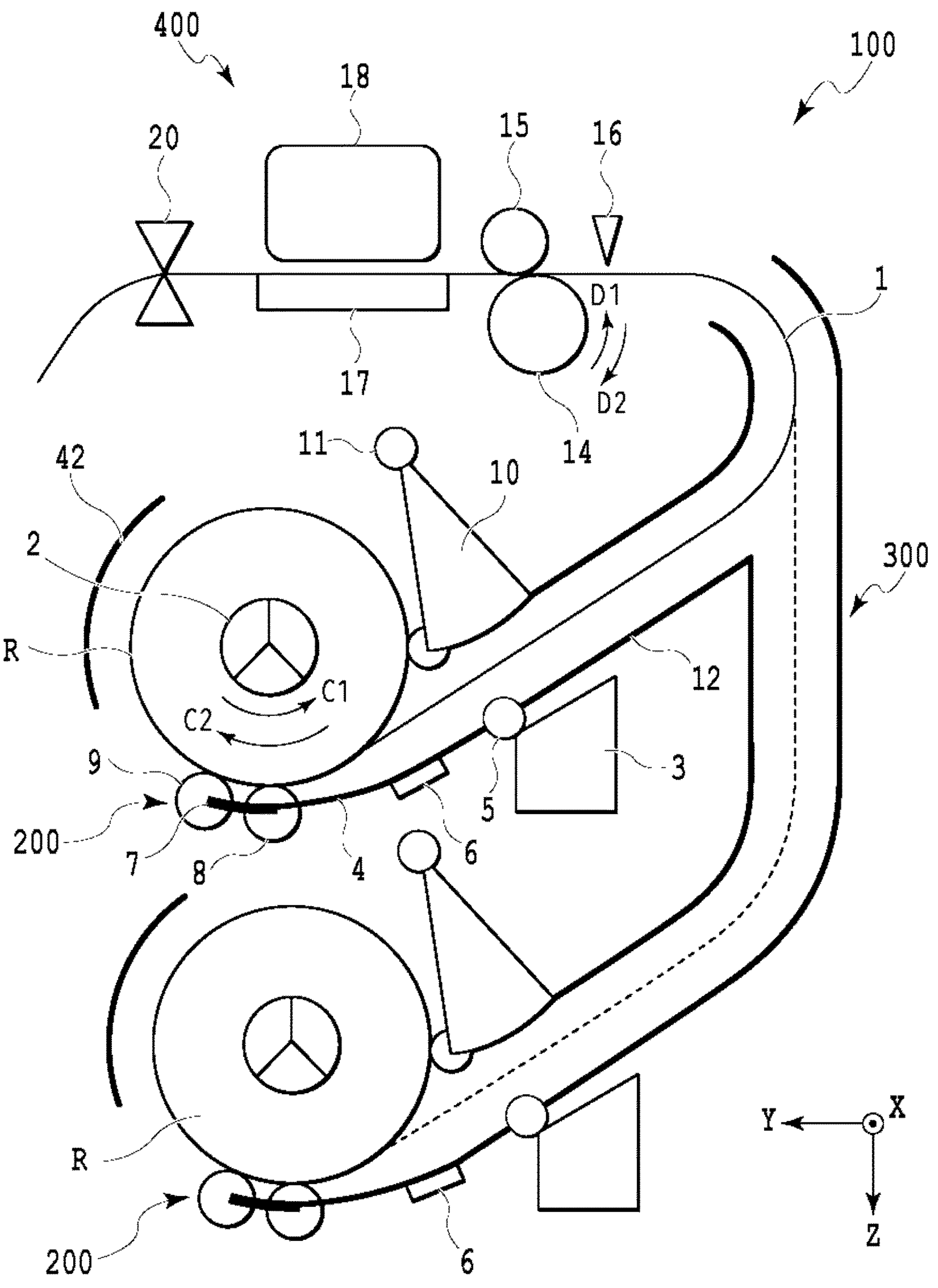
FIG. 2 is an explanatory diagram of a conveyance path of a sheet in a printing apparatus.

FIG. 2 is a schematic cross-sectional view of a main part of the printing apparatus 100. Two supplying apparatuses 200 corresponding to the two rolls R are installed one above the other. The sheet 1 pulled out of the roll R by the supplying apparatus 200 is conveyed, along a sheet conveyance path by a sheet conveying unit (conveying mechanism) 300, to the printing unit 400 capable of printing an image. The printing unit 400 prints an image on the sheet 1 by ejecting ink from an inkjet type print head 18. The print head 18 ejects ink from an ejection port using an ejection energy generating element such as an electrothermal transducer (heater) or a piezo element. The print head 18 is not limited only to the inkjet system, and a printing system of the printing unit 400 is not limited, and, for example, a serial scan system or a full line system may be used. In the case of the serial scan system, an image is printed in association with a conveyance operation of the sheet 1 and scanning of print head 18 in a direction intersecting with a conveyance direction of the sheet 1. In the case of the full line system, an image is printed, while continuously conveying the sheet 1, using the long print head 18 extending in a direction intersecting with the conveyance direction of the sheet 1.

The roll R is set in the roll holding unit of the supplying apparatus 200 in a state in which a spool member 2 is inserted in a hollow hole portion of the roll R, and the spool member 2 is driven by a motor 33 for driving the roll R (see FIG. 5) to rotate normally or reversely. The supplying apparatus 200 includes, as described later, a driving unit 3, an arm member (mobile body) 4, an arm rotational shaft 5, a sensor unit 6, a swing member 7, driving rotating bodies (contact bodies) 8 and 9, a separating flapper (upper side guide body) 10, and a flapper rotational shaft 11.

A conveyance guide 12 guides the sheet 1 to the printing unit 400 while guiding front and back surfaces of the sheet 1 pulled out from the supplying apparatus 200. A conveying roller 14 is rotated normally or reversely in directions of arrows D1 and D2 by a conveying roller driving motor 35 (see FIG. 5) to be described later. A nip roller 15 can be drivenly rotated in accordance with the rotation of the conveying roller 14 and can be brought into contact with or separated from the conveying roller 14 by a nip force adjusting motor 37 (see FIG. 5), and nip force thereof can be adjusted. A conveyance speed of the sheet 1 by the conveying roller 14 is set to be higher than a pulled-out speed of the sheet 1 by the rotation of the roll R, so that it is possible to apply back tension to the sheet 1 and convey the sheet 1 in a state in which the sheet 1 is stretched.

A platen 17 of the printing unit 400 regulates the position of the sheet 1, and a cutter 20 cuts the sheet 1 on which an image is printed. A cover 42 of the roll R prevents the sheet 1 on which an image is printed from entering the supplying apparatus 200. The operation in the printing apparatus 100 is controlled by a CPU 201 (see FIG. 5) to be described later. The platen 17 includes a sucking device using negative pressure or electrostatic force, and the sheet can be stably supported since the sheet is sucked onto the platen 17.

Figure 3A:
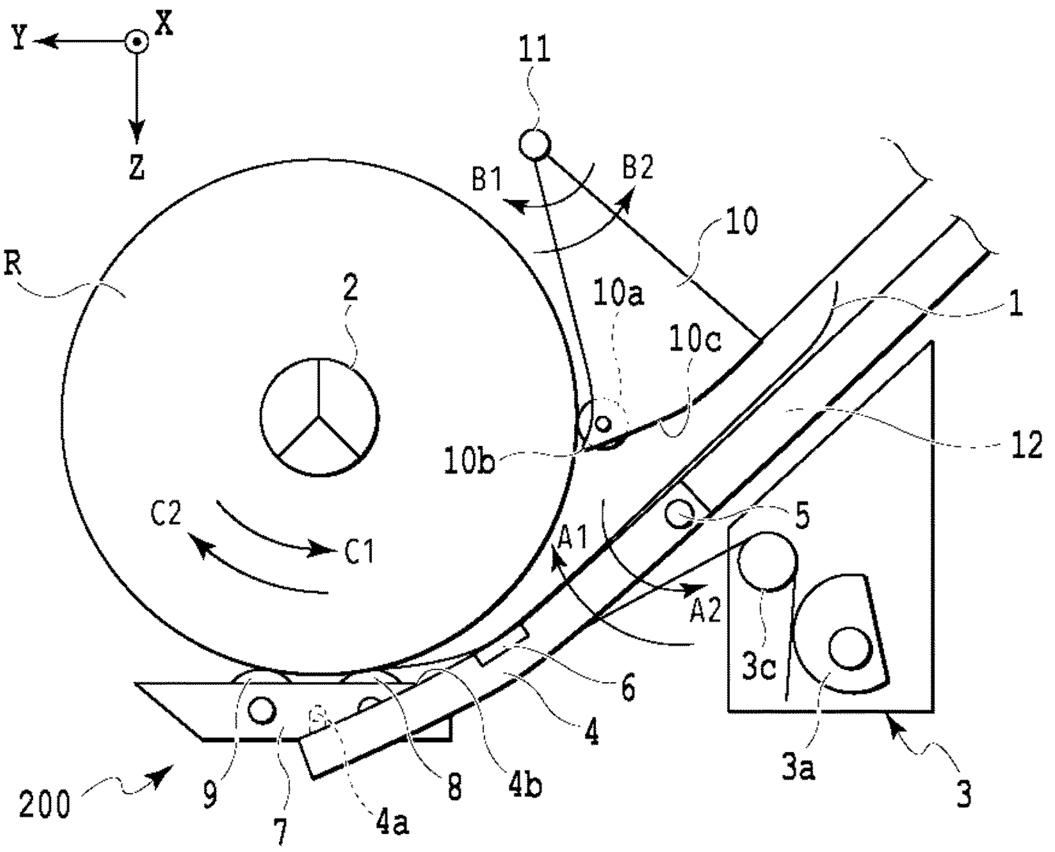
FIGS. 3A and 3B are explanatory diagrams of a sheet supplying apparatus.
Figure 3B:
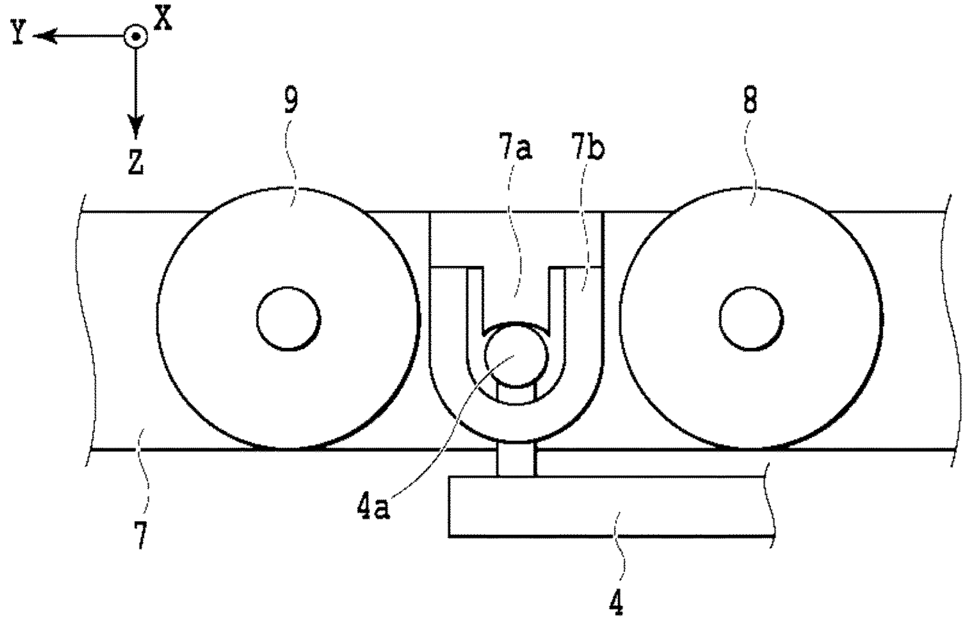

FIGS. 3A and 3B are explanatory diagrams of the supplying apparatus 200, and the roll R in FIG. 3A is in a state in which an outer diameter thereof is relatively large. The arm member (mobile body) 4 is attached to the conveyance guide 12 to be rotatable on the arm rotational shaft 5 in directions of arrows A1 and A2. A guide portion 4*b* (lower guide body) that guides a lower surface of the sheet 1 (a front surface or a print surface of the roll sheet) pulled out of the roll R is formed on an upper part of the arm member 4. A helical torsion spring 3*c* that presses the arm member 4 in the direction of the arrow A1 is interposed between the arm member 4 and a rotating cam 3*a* of the driving unit 3. The rotating cam 3*a* is rotated by a pressing force adjusting motor 34 (see FIG. 5) to be described later, and a force in which the helical torsion spring 3*c* presses the arm member 4 in the direction of the arrow A1 changes in accordance with the rotational position thereof. When the leading end portion of the sheet 1 (a part of the sheet 1 including a leading end (edge)) is set in the sheet supply path between the arm member 4 and a separating flapper 10, the pressing force of the arm member 4 by the helical torsion spring 3*c* is switched to three stages depending on the rotational position of the rotating cam 3*a*. In other words, the pressing force of the arm member 4 is switched to a pressing state by a comparatively small force (pressing force of a weak nip), a pressing state by a relatively large force (pressing force of a strong nip), and a pressing force releasing state.

The swing member 7 is swingably attached to the arm member 4, and the first and second driving rotating bodies (rotating bodies) 8 and 9 which are positioned to deviate in a circumferential direction of the roll R are rotatably mounted to the swing member 7. The driving rotating bodies 8 and 9 move in accordance with an outer shape of the roll R and come into pressure contact with the outer circumferential portion of the roll R from a lower side in the gravity direction in accordance with pressing force against the arm member 4 in the direction of arrow A1. In other words, the driving rotating bodies 8 and 9 come into pressure contact with the outer circumference portion of the roll R from a side lower in the gravity direction than a central shaft of the roll R. The pressure contact force is changed in accordance with pressing force of pressing the arm member 4 in the direction of arrow A1.

A plurality of arm members 4 each including the swing member 7 are provided at a plurality of different positions in the X-axis direction. As illustrated in FIG. 3B, the swing member 7 includes a bearing portion 7*a* and a shaft fastening portion 7*b*, and thus a rotational shaft 4*a* of the arm member 4 is accepted with predetermined looseness.

The bearing portion 7*a* is provided at a gravity center position of the swing member 7 and supported by the rotational shaft 4*a* so that the swing member 7 has a stable attitude in each of the X-axis direction, the Y-axis direction, and the Z-axis direction. Further, since the rotational shaft 4*a* is accepted with looseness, any of a plurality of swing members 7 are displaced along the outer circumference portion of the roll R depending on the pressing force against the arm member 4 in the direction of the arrow A1. With such a configuration (equalizing mechanism), a change in a pressure contact attitude of the first and second driving rotating bodies 8 and 9 with respect to the outer circumferential portion of the roll R is permitted. As a result, a contact region between the sheet 1 and the first and second driving rotating bodies 8 and 9 is kept at maximum, and the pressing force against the sheet 1 is equalized, and thus a variation in the conveyance force of the sheet 1 can be suppressed. Since the driving rotating bodies 8 and 9 come into pressure contact with the outer circumference portion of the roll R, the occurrence of slack in the sheet 1 is suppressed, and conveyance force thereof is enhanced.

In a main body of the printing apparatus 100 (printer main body), the separating flapper 10 positioned above the arm member 4 is attached to be rotatable on the flapper rotational shaft 11 in the directions of the arrows B1 and B2. The separating flapper 10 is configured to lightly press an outer circumferential surface of the roll R by its own weight. In a case in which it is necessary to more strongly press the roll R, biasing force by a biasing member such as a spring may be used. A driven roller (upper contact body) 10*a* is rotatably provided at a contact portion of the separating flapper 10 with the roll R to suppress influence of the pressing force on the sheet 1. A separating portion 10*b* of the leading end of the separating flapper 10 is formed to extend up to a position as close to the outer circumferential surface of the roll R as possible in order to facilitate the separation of the leading end portion of the sheet from the roll R.

The sheet 1 is supplied through the supply path formed between the separating flapper 10 and the arm member 4 after the front surface (print surface) of the sheet is guided by the upper guide portion 4*b* of the arm member 4. Accordingly, it is possible to smoothly supply the sheet 1 using the weight of the sheet 1. Further, since the driving rotating bodies 8 and 9 and the guide portion 4 are moved depending on the outer diameter of the roll R, it is possible to reliably pull out the sheet 1 from the roll R and convey the sheet even when the outer diameter of the roll R changes.

One of the features of the apparatus according to the present embodiment lies in an automatic sheet loading function (an automatic sheet feeding function). In the automatic loading, when the user sets the roll R in the apparatus, the apparatus detects the leading end of the sheet while rotating the roll R in a direction (which is referred to as an opposite direction or a second direction, a direction of arrow C2 in FIG. 3A) opposite to a rotation direction (a first direction, that is, a direction of the arrow C1 in FIG. 3A) when the sheet is supplied (fed). The sensor unit 6 is a unit including a leading end detecting sensor which detects the separation of the leading end portion of the sheet 1 from the outer circumferential surface of the roll R. If the sensor unit 6 detects the separation of the leading end portion of the sheet 1 from the outer circumferential surface of the roll sheet wound inward, the apparatus rotates the roll R in the first direction and supplies the leading end portion including the leading end (edge) of the sheet 1 to the inside of the sheet supply path between the arm member 4 and the separating flapper 10. A more detailed procedure of the automatic loading function will be described later.

Further, the printing apparatus 100 of the present example includes the two upper and lower supplying apparatuses 200, and it is possible to perform switching from a state in which the sheet 1 is supplied from one supplying apparatus 200 to a state in which the sheet 1 is supplied from the other supplying apparatus 200. In this case, one supplying apparatus 200 rewinds the sheet 1 which has been supplied so far on the roll R. The leading end portion of the sheet 1 is evacuated up to the position at which the leading end thereof is detected by the sensor unit 6.

Figure 4:
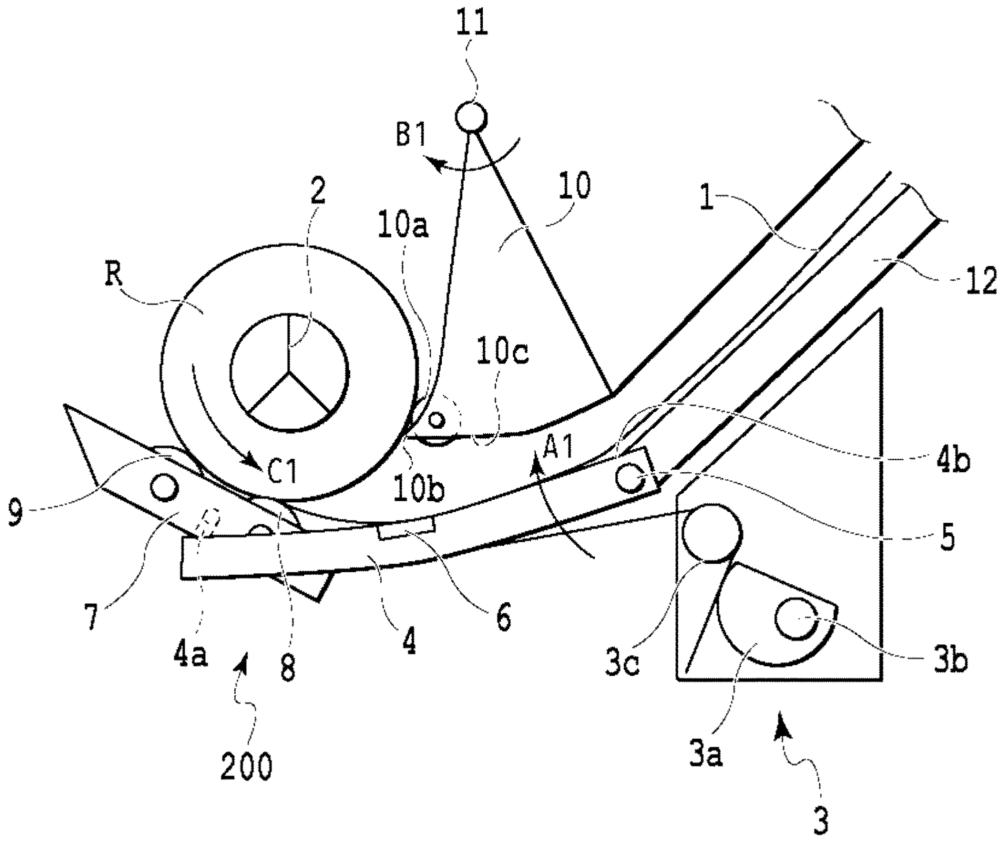
FIG. 4 is an explanatory diagram of a sheet supplying apparatus in a case in which a roll outer diameter is small.

FIG. 4 is an explanatory diagram of the supplying apparatus 200 when the outer diameter of the roll R is relatively small. Since the arm member 4 is pressed in the direction of the arrow A1 by the helical torsion spring 3*c*, the arm member 4 moves in the direction of the arrow A1 in accordance with a decrease in the outer diameter of the roll R. Further, by rotating the rotating cam 3*a* in accordance with the change in the outer diameter of the roll R, the pressing force of the arm member 4 by the helical torsion spring 3*c* can be maintained within a predetermined range even though the outer diameter of the roll R changes. Since the separating flapper 10 is also pressed in the direction of arrow B1, the separating flapper 10 moves in the direction of arrow B1 in accordance with the decrease in the outer diameter of the roll R. Accordingly, even when the outer diameter of the roll R is decreased, the separating flapper 10 forms the supply path with the conveyance guide 12 and guides the upper surface of the sheet 1 by a lower surface 10*c*. As described above, the arm member 4 and the separating flapper 10 are rotated in accordance with the change in the outer diameter of the roll R, and thus even when the outer diameter of the roll R is changed, the supply path having a substantially constant size is formed between the arm member 4 and the separating flapper 10.

Figure 5:
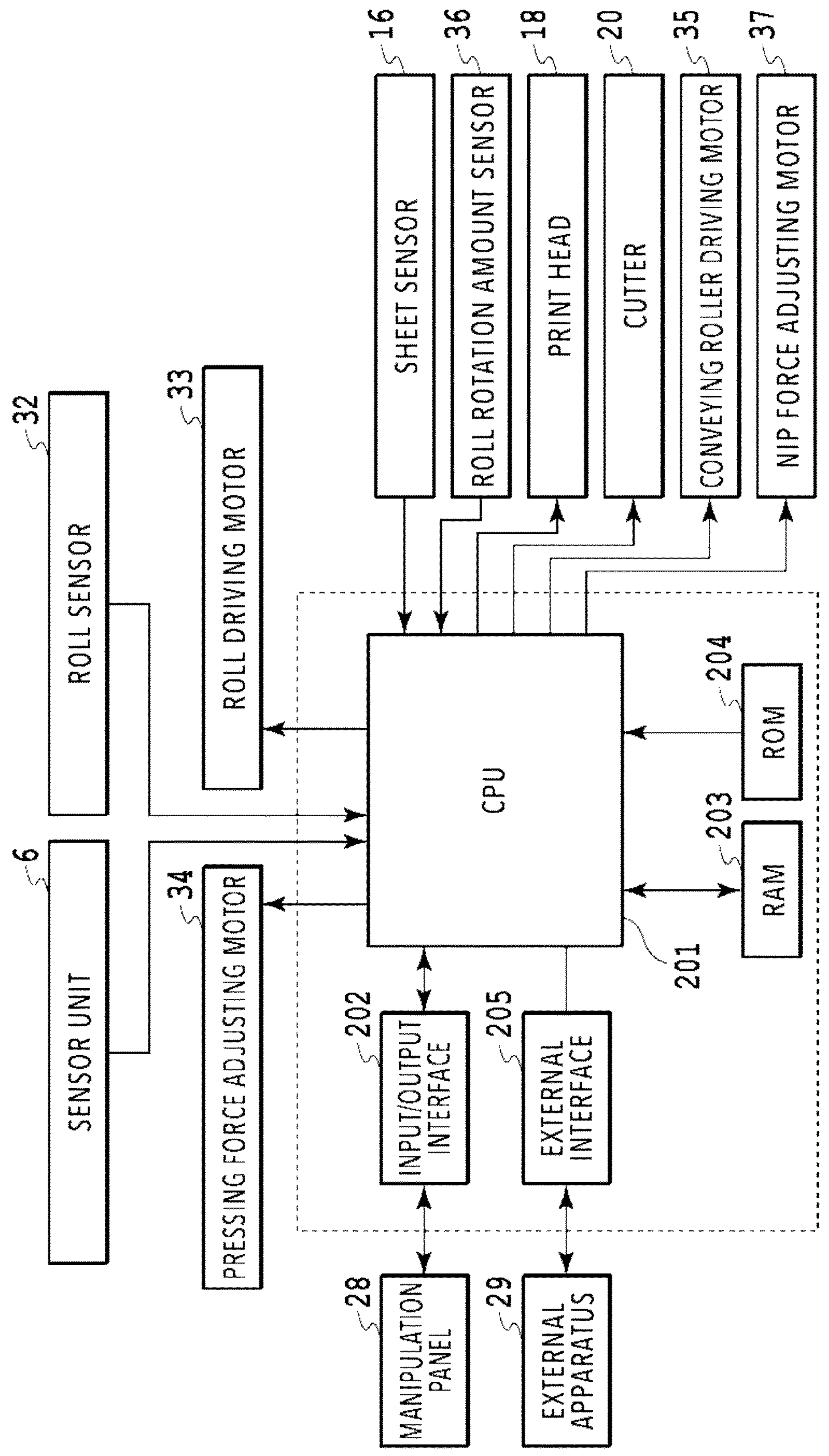
FIG. 5 is a block diagram for describing a control system of a printing apparatus.

FIG. 5 is a block diagram for describing a configuration example of a control system in the printing apparatus 100. The CPU 201 of the printing apparatus 100 controls the respective units of the printing apparatus 100 including the supplying apparatus 200, the sheet conveying unit 300, and the printing unit 400 in accordance with a control program stored in a ROM 204. A type and a width of the sheet 1, various setting information, and the like are input to the CPU 201 from the manipulation panel 28 via an input/output interface 202. Further, the CPU 201 is connected to various external apparatuses 29 including a host apparatus such as a personal computer via an external interface 205, and exchanges various information such as print data with the external apparatus 29. Further, the CPU 201 performs writing and reading of information related to the sheet 1 and the like on a RAM 203. The motor 33 is a roll driving motor for rotating the roll R normally or reversely through the spool member 2, and constitutes a driving mechanism (rotation mechanism) capable of rotationally driving the roll R. The pressing force adjusting motor 34 is a motor for rotating the rotating cam 3*a* in order to adjust the pressing force against the arm member 4. The conveying roller driving motor 35 is a motor for rotating the conveying roller 14 normally or reversely. A roll sensor 32 is a sensor for detecting the spool member 2 of the roll R when the roll R is set in the supplying apparatus 200. A roll rotation amount sensor 36 is a sensor (rotation angle detection sensor) for detecting a rotation amount of the spool member 2, and is, for example, a rotary encoder that outputs pulses which correspond in number to the rotation amount of the roll R.

<Sheet Supply Preparation Process>

Figure 6:
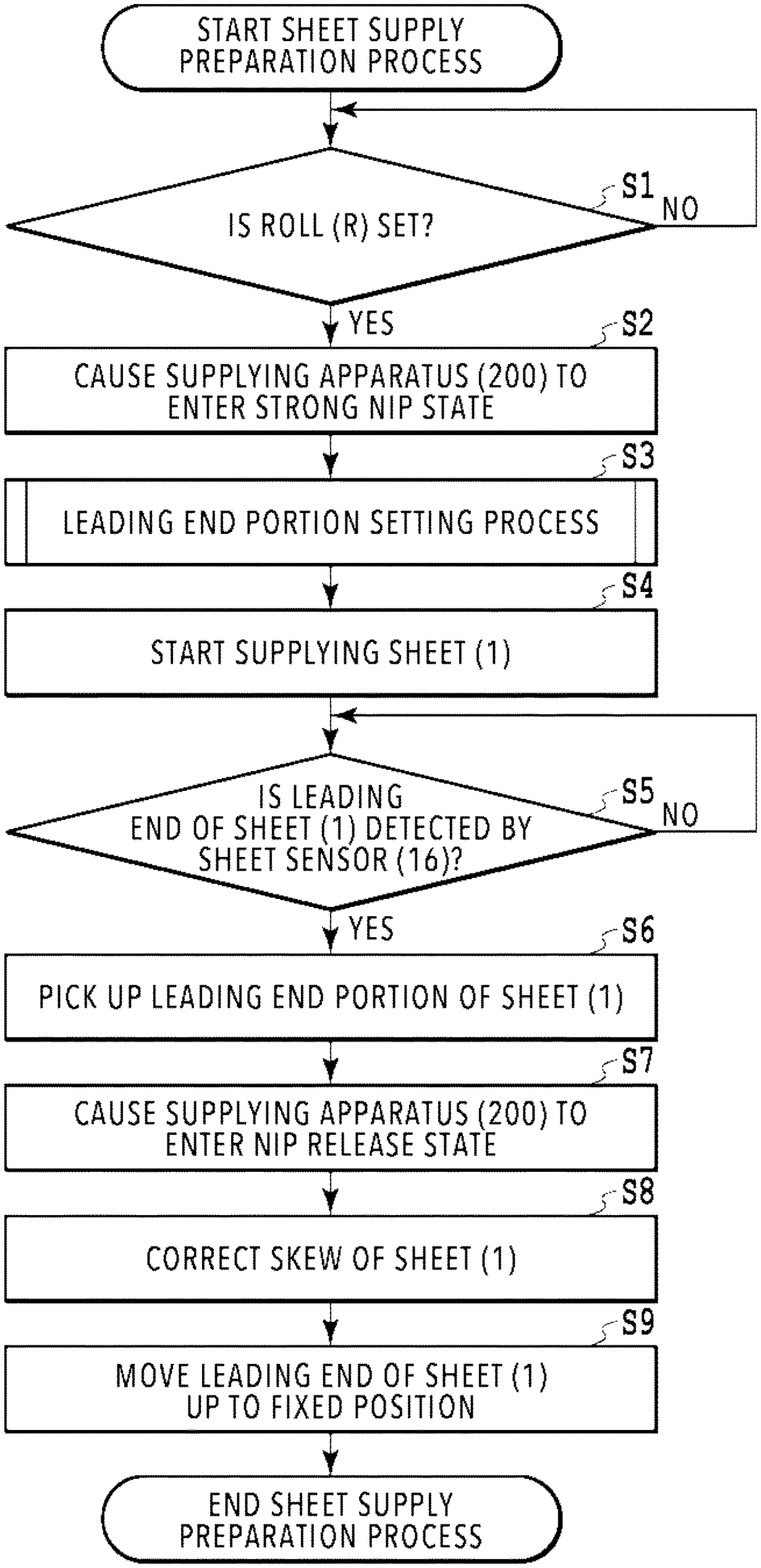
FIG. 6 is a flowchart of a sheet supply preparation process.

FIG. 6 is a flowchart for describing a supply preparation process of the sheet 1 starting from the setting of the roll R.

The CPU 201 of the printing apparatus 100 stands by in a state in which the arm member 4 is pressed in the direction of the arrow A1 by "weak pressing force" (a weak nip state), and first determines whether or not the roll R is set (step S1). In the present example, when the roll sensor 32 detects the spool member 2 of the roll R, the roll R is determined to be set. After the roll R is set, the CPU 201 switches a state in which the arm member 4 is pressed in the direction of the arrow A1 by "strong pressing force" (a strong nip state) (step S2). Then, the CPU 201 executes a leading end portion setting process in which the leading end portion of the sheet 1 is set in the sheet supply path between the arm member 4 and the separating flapper 10 (step S3). With the leading end portion setting process (automatic loading), the leading end portion of the sheet 1 is set (inserted) in the sheet supply path. The leading end portion setting process will be described later in detail.

Thereafter, the CPU 201 rotates the roll R in the direction of the arrow C1 by the roll driving motor 33 and starts supplying the sheet 1 (step S4). When the leading end of the sheet 1 is detected by a sheet sensor 16 (step S5), the CPU 201 normally rotates the conveying roller 14 in a direction of arrow D1, picks up the leading end portion of the sheet 1, and then stops the motor 33 and the motor 35 (step S6). Thereafter, the CPU 201 cancels the pressing force of pressing the arm member 4 in the direction of arrow A1, and causes the first and second driven rotating bodies 8 and 9 to be separated from the roll R (to enter a nip release state) (step S7).

Thereafter, the CPU 201 determines whether the sheet is conveyed (skewed) in a state in which the sheet is obliquely inclined in the sheet conveying unit 300. Specifically, the sheet 1 is conveyed by a predetermined amount in the sheet conveying unit 300, and an amount of skew occurring at that time is detected by a sensor installed in a carriage including the print head 18 or installed in the sheet conveying unit 300. When the amount of skew is larger than a predetermined allowable amount, the sheet 1 is repeatedly fed or back-fed with the normal rotation and the reverse rotation of the conveying roller 14 and the roll R while applying back tension to the sheet 1. With this operation, the skew of the sheet 1 is corrected (step S8). As described above, when the skew of the sheet 1 is corrected or when an operation of printing an image on the sheet 1 is performed, the supplying apparatus 200 is set to enter the nip release state. Thereafter, the CPU 201 causes the sheet conveying unit 300 to move the leading end of the sheet 1 to a standby position (a fixed position) before printing starts in the printing unit 400 (step S9). Accordingly, the preparation for supplying the sheet 1 is completed. Thereafter, the sheet 1 is pulled out from the roll R with the rotation of the roll R and conveyed to the printing unit 400 by the sheet conveying unit 300.

First Embodiment

An embodiment of the leading end portion setting process (step S3 in FIG. 6) executed by the printing apparatus 100 will be described below. In the present embodiment, at the time of the leading end portion setting process, the loose roll R is tightened and wound tightly without intervention of the user.

A basic procedure of winding tightly is as follows. The roll is caused to perform more than one rotation in the opposite direction (the direction of arrow C2) prior to the sheet feeding operation. During the time, the roll is caused to rotate in the opposite direction continuously until a detection cycle in which the sensor detects the sheet leading end portion twice or more falls within a predetermined allowable range. With this operation, the roll R is tightly wound on the apparatus, and thus the loose roll R is tightened. After this operation, the automatic sheet feeding is performed. This will be described in detail below.

<Configuration of Sensor Unit>

Figure 7:
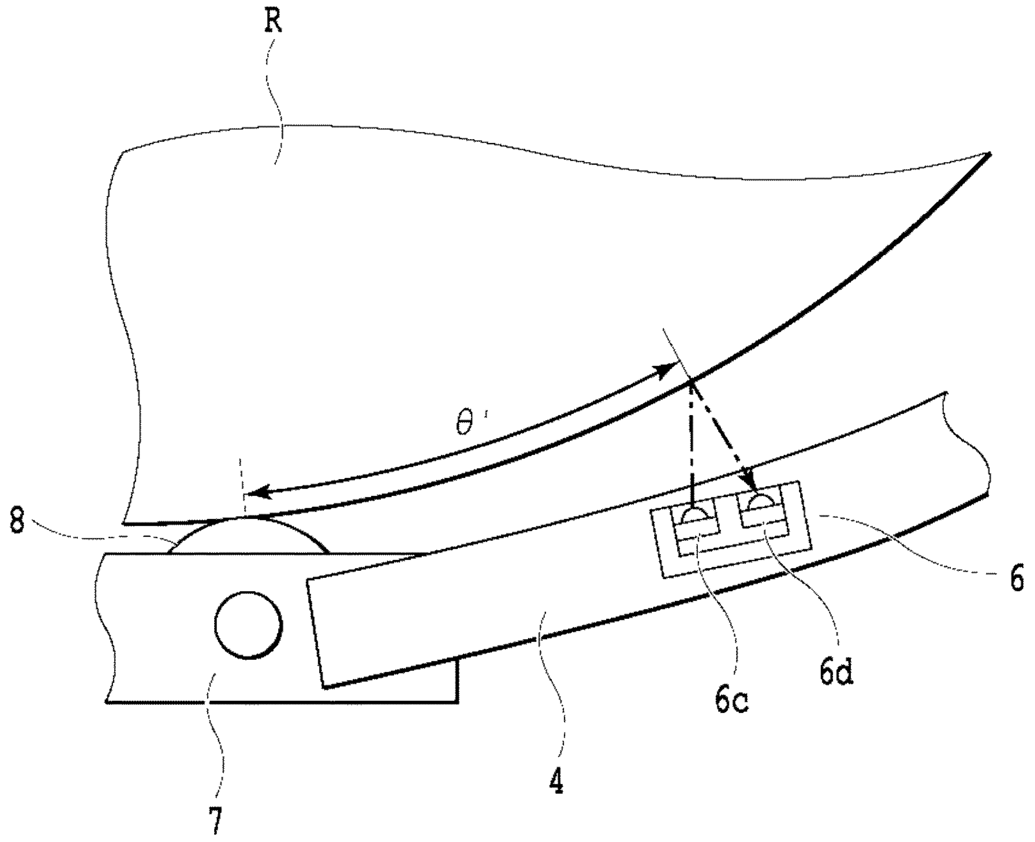
FIG. 7 is an explanatory diagram of a sensor unit.

The sensor unit 6 according to the present embodiment will be described below with reference to FIG. 7. As shown in FIG. 7, the sensor unit 6 is an optical sensor unit including a light emitting unit 6*c* such as an LED, an OLED, or an LD, and a light receiving unit 6*d* such as a photodiode. Light of the light emitting unit 6*c* irradiated toward the roll R is reflected by the front surface of the roll R and detected by the light receiving unit 6*d*. The sensor unit 6 is connected to the CPU 201, and the CPU 201 can acquire an output value of the sensor unit 6 at an arbitrary timing. The light which is irradiated from the light emitting unit 6*c* and detected by the light receiving unit 6*d* includes light regularly reflected by the front surface of the roll R. The output value of the sensor unit 6 varies in accordance with a distance (interval) between the sensor unit 6 and the front surface of the sheet (the print surface on which printing is performed by the printing unit). In other words, the sensor unit 6 has a characteristic that the output value increases as the distance between the sensor unit 6 and the front surface of the roll R decreases, and the output value decreases as the distance increases. Here, as the sensor unit 6, an arbitrary sensor may be used as long as the sensor has an output value changing according to the distance between the sensor unit 6 and the front surface of the roll R. Further, the light detected by the light receiving unit 6*d* may not include regularly reflected light. Further, the sensor unit 6 is not limited to the optical sensor, and a vibration-sensitive sensor that can be attached to the separating flapper 10 may be used as the sensor unit.

<Leading End Portion Setting Process>

The leading end portion setting process (step S3 in FIG. 6) according to the present embodiment will be described below with reference to FIG. 8.

First, the CPU 201 starts acquisition of the output value of the sensor unit 6 (step S31), and causes the roll R to rotate in an opposite direction (in the direction of arrow C2) (step S32). Then, the CPU 201 detects a change (inversion) from a high level (hereinafter an "H level") to a low level (hereinafter an "L level") in the output of the sensor unit 6 (step S33).

Figure 9A:
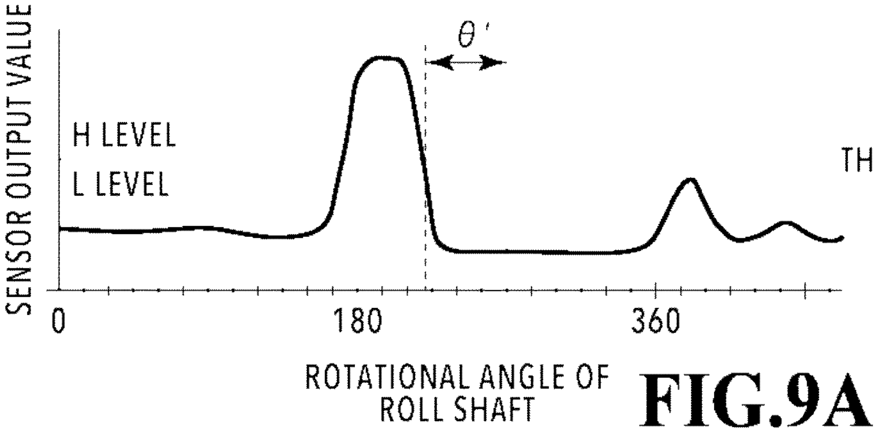
FIGS. 9A, 9B, and 9C are explanatory diagrams of an output change of a sensor unit.

Here, FIG. 9A illustrates a relation between a rotational angle of a shaft of the roll R and the output value of the sensor unit 6. In this example, the acquisition of the output value of the sensor unit 6 is started in step S31, and the rotational angle at a time point at which the rotation of the roll R in the opposite direction is started in step S32 is set to 0°. After the rotation of the roll R in the opposite direction starts, the leading end of the sheet 1 passes through the position at which the driven roller 10*a* in the separating flapper 10 comes into contact with the roll R at a time point at which the roll R rotates 170°, and the leading end portion of the sheet 1 is separated from the outer circumferential surface of the roll sheet wound on the inside thereof due to its own weight and falls down onto the arm member 4. In this case, the distance between the leading end portion of the sheet 1 and the sensor unit 6 decreases as in a state illustrated in FIG. 9B. Accordingly, the distance between the sensor unit 6 and the reflecting surface decreases, and thus the output value of the sensor unit 6 reaches the H level.

Figure 9B:
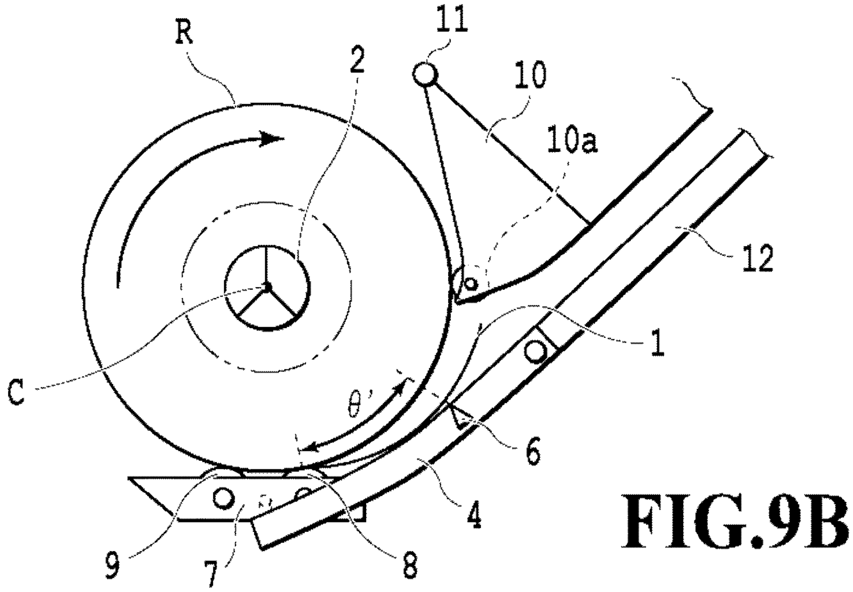
Figure 9C:
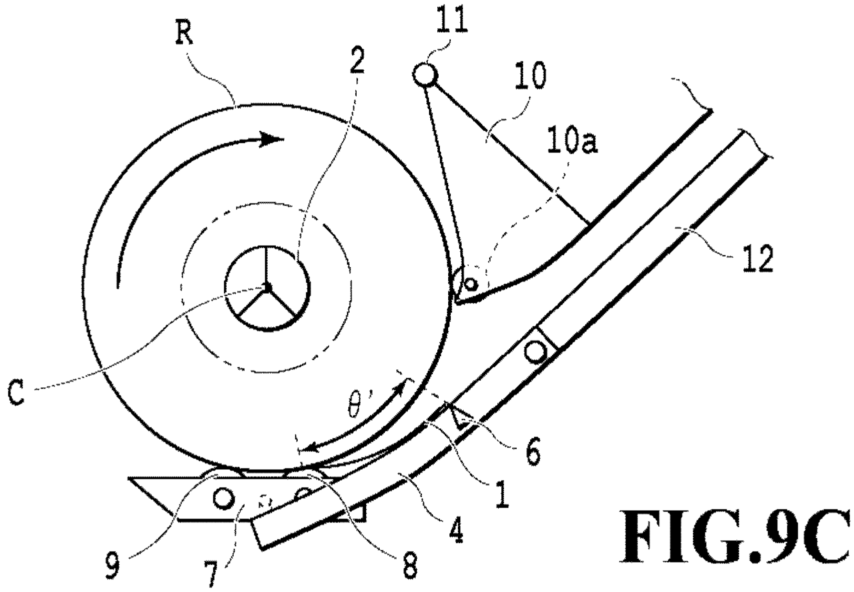

In a case in which the rotation is continued thereafter, the leading end of the sheet 1 passes over the sensor unit 6 at a time point at which the rotational angle exceeds 200° and enters a state as illustrated in FIG. 9C. In this state, the sensor unit 6 detects the light reflected by the front surface of the roll R again other than the leading end portion of the sheet 1, and the distance between the sensor unit 6 and the reflecting surface increases, and thus the output of the sensor unit 6 changes from the H level to the L level. Thereafter, the rotation is continued, and the leading end of the sheet 1 passes through the position at which the driven rotating body 9 comes into contact with the roll R. At this point, the output of the sensor unit 6 maintains the state of the L level.

The H level and L level indicate the levels to which the output values of the sensor unit 6 belong. The output of the sensor unit 6 having the H level indicates that the distance between the sensor unit 6 and the reflecting surface is short, and the output of the sensor unit 6 having the L level indicates that the distance between the sensor unit 6 and the reflecting surface is long. A leading end detection threshold value TH used for determining whether the output of the sensor unit 6 is the H level or the L level is stored in a non-volatile memory in the printer main body or the sensor unit. In this example, the threshold value TH is set to $TH=(H0+L0)/2$. Here, L0 is an output value of the sensor unit 6 when the leading end portion of the sheet 1 is positioned between the driven rotating body 8 and the sensor unit 6 (FIG. 9C). Further, H0 is an output value of the sensor unit 6 when the sheet 1 abuts on the arm member 4, and the leading end portion of the sheet 1 is positioned between the sensor unit 6 and the driven roller 10*a* (FIG. 9B). Since the threshold value TH varies due to a variation occurring when a sensor is manufactured, L0 and H0 may be measured for each individual sensor, and the threshold value TH may be calculated on the basis of the measured value.

Figure 8:
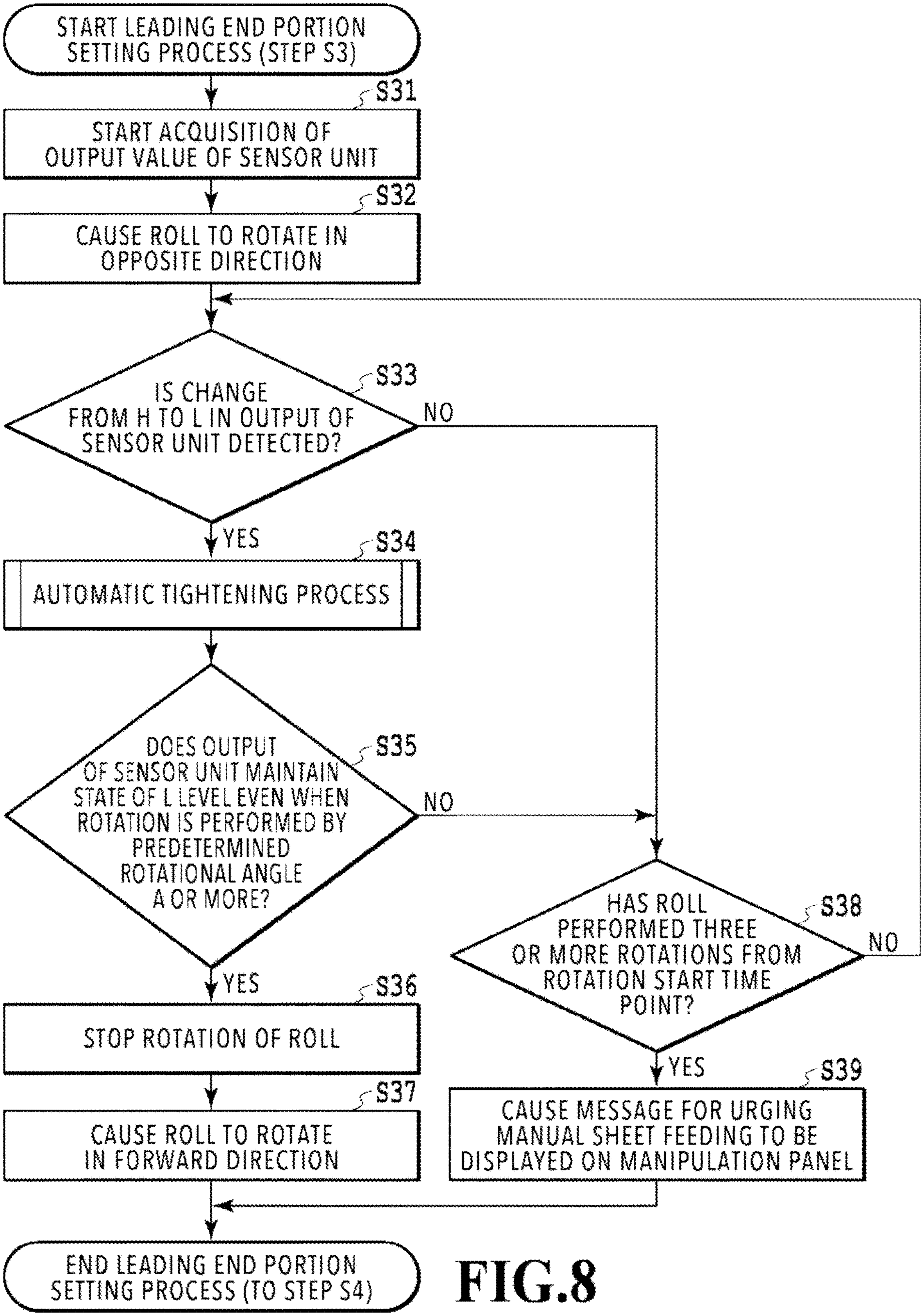
FIG. 8 is a flowchart of a leading end portion setting process.

The description returns to the flow of FIG. 8. In a case in which the output of the sensor unit 6 is detected to change from the H level to the L level (YES in step S33), it is regarded that the leading end of the sheet 1 is in a state immediately after it has just passed over the sensor unit 6, and the leading end is positioned close to the sensor unit 6, and the position of the leading end is specified. In this case, the CPU 201 causes the rotation of the roll R to continue and executes an automatic tightening process of tightening the loose roll R without intervention of the user (step S34). The automatic tightening process will be described later in detail with reference to FIG. 10.

In a case in which the roll R is determined not to be loose in the automatic tightening process (step S34), the CPU 201 causes the rotation of the spool member 2 to continue. Then, the CPU 201 determines whether or not the output of the sensor unit 6 maintains the state of the L level even when the roll R is caused to rotate by a predetermined rotational angle or more (this rotational angle is assumed to be "A") from the state immediately after the leading end of the sheet 1 has passed over the sensor unit 6 (step S35). Here, the predetermined rotational angle A is determined to satisfy θ'>A on the basis of an angle (θ') formed by a straight line connecting a rotation center C with the sensor unit 6 and a straight line connecting the rotation center C and the driven rotating body 8. In this example, A=θ'/2. In a case in which YES is determined in step S35, the CPU 201 causes the rotation of the roll R to be stopped (step S36). At this time, the leading end of the sheet 1 is positioned between the driven roller 10*a* and the arm member 4. Therefore, the CPU 201 then causes the spool member 2 to rotate in the forward direction (the direction of the arrow C2) (step S37), so that the leading end portion of the sheet 1 can pass through between the arm member 4 and the separating flapper 10 and be guided to the inside of the sheet supply path.

In a case in which NO is determined in step S33 or step S35, the CPU 201 determines whether or not the roll R has performed three or more rotations from a rotation start time point (step S38). In a case in which NO is determined in step S38, the process returns to step S33, and on the other hand, in a case in which YES is determined, the CPU 201 stops the rotation of the roll R and the inversion detection of the output of the sensor unit 6 and urges the user to perform a manual manipulation (manual sheet feeding). Specifically, since the automatic sheet feeding has failed, a message for urging the user to perform the manual sheet feeding is displayed on the manipulation panel 28 (step S39). In this example, it is determined in step S38 whether or not the roll R has performed three or more rotations, but a threshold value used for determining whether or not the roll R has performed a predetermined number of rotations or more is not limited to 3 and may be arbitrarily set. The content of the leading end portion setting process according to the present embodiment has been described above.

In a case in which the roll is set in the printing apparatus through the leading end portion setting process according to the present embodiment, the loose roll is automatically tightened, and then the leading end portion of the sheet is guided to the inside of the sheet supply path. Therefore, the user need not manually tighten the sheet after setting the roll and need not set the leading end portion of the sheet in the sheet supply path. Thus, the convenience in the case of setting the roll is improved.

<Detailed Description of Automatic Tightening Process>

Hereinafter, the automatic tightening process (S34 in FIG. 8) according to the present embodiment will be described with reference to FIG. 10.

The automatic tightening process starts in a state in which the roll R is caused to rotate in the opposite direction. First, the CPU 201 reads a rotational angle (referred to as "Q1") of the shaft of the roll R at a timing at which an immediately previous output of the sensor unit 6 changes from the H level to the L level through the roll rotation amount sensor 36 and stores the read rotational angle in a volatile memory (step S341). Then, the CPU 201 causes the rotation to continue in a state in which the driven rotating bodies 8 and 9 come into pressure contact with the outer peripheral portion of the roll R. Then, in a case in which the roll R is loose, a sheet surface portion is wound up on the roll R, and the loose roll R is tightly wound (see a surface portion 1*a* of FIG. 11A and a surface portion 1*b* of FIG. 11B). Then, the CPU 201 determines whether or not a change from the H level to the L level in the output of the sensor unit 6, which occurs after the leading end of the sheet 1 passes over the sensor unit 6 again, is detected (step S342).

A case in which the change from the H level to the L level in the output of sensor unit 6 is detected (YES in step S342) will be described below. In this case, the CPU 201 reads a rotational angle (referred to as "Q2") of the shaft of the roll R at a timing at which an immediately previous output of the sensor unit 6 changes from the H level to the L level through the roll rotation amount sensor 36 and stores the read rotational angle in the volatile memory (step S343).

Figure 11A:
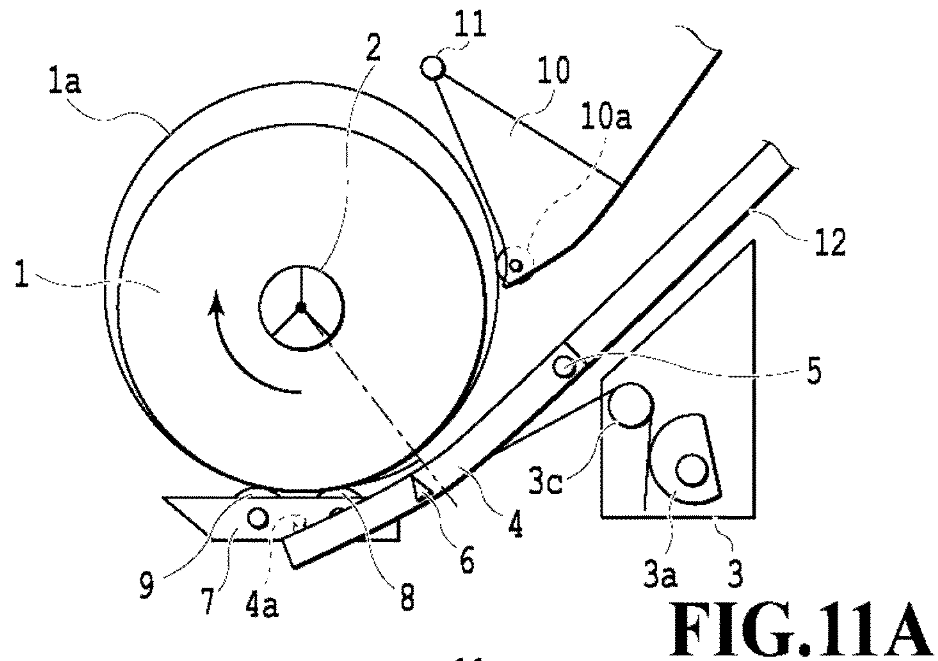
FIGS. 11A, 11B, and 11C are explanatory diagrams of an automatic tightening process.
Figure 11B:
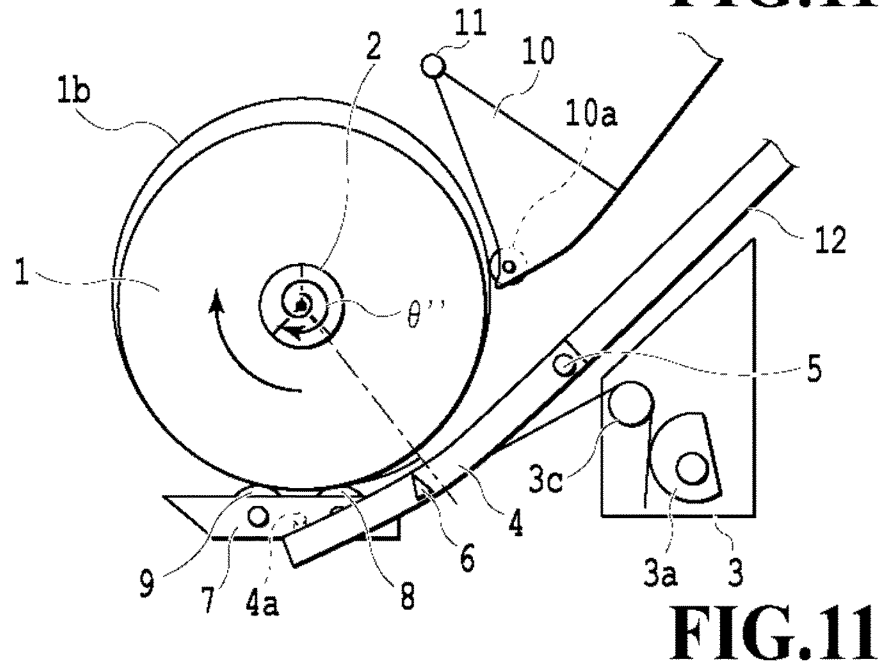
Figure 11C:
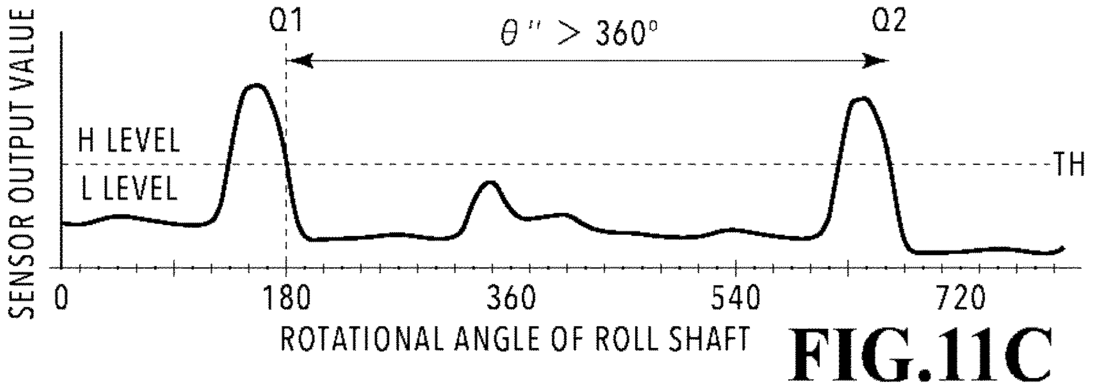

Here, the reason for acquiring Q1 and Q2 will be described. In a case in which the loose roll R is tightly wound as illustrated in FIGS. 11A and 11B while Q2 is being acquired after Q1 is acquired, the shaft of the roll R rotates 360° or more by a tightly wound amount. Therefore, it is possible to determine whether or not the loose roll R is tightened using an angular phase difference between Q2 and Q1 as illustrated in FIG. 11C. In detail, in a case in which the angular phase difference between Q2 and Q1 is less than a predetermined angle (the predetermined angle is indicated by θ", the loose roll R can be determined to be tightened. Viewed from another angle, the loose roll R is determined to be tightened in a case in which the detection cycle in which the sensor detects the sheet leading end portion two or more times falls within a predetermined allowable range while the roll is performing more than one rotation in the opposite direction.

The angle θ" may be set to a predetermined angle of 360° or more in view of a reading accuracy of the sensor unit 6 or uncertainty of a motion of the leading end portion of the sheet 1. In the present embodiment, the angle θ" is set to 370°, the sequence is continued until the angular phase difference between Q2 and Q1 becomes less than 370° while overwriting Q1 and Q2, and thus the roll sheet can be automatically tightly wound.

Figure 10:
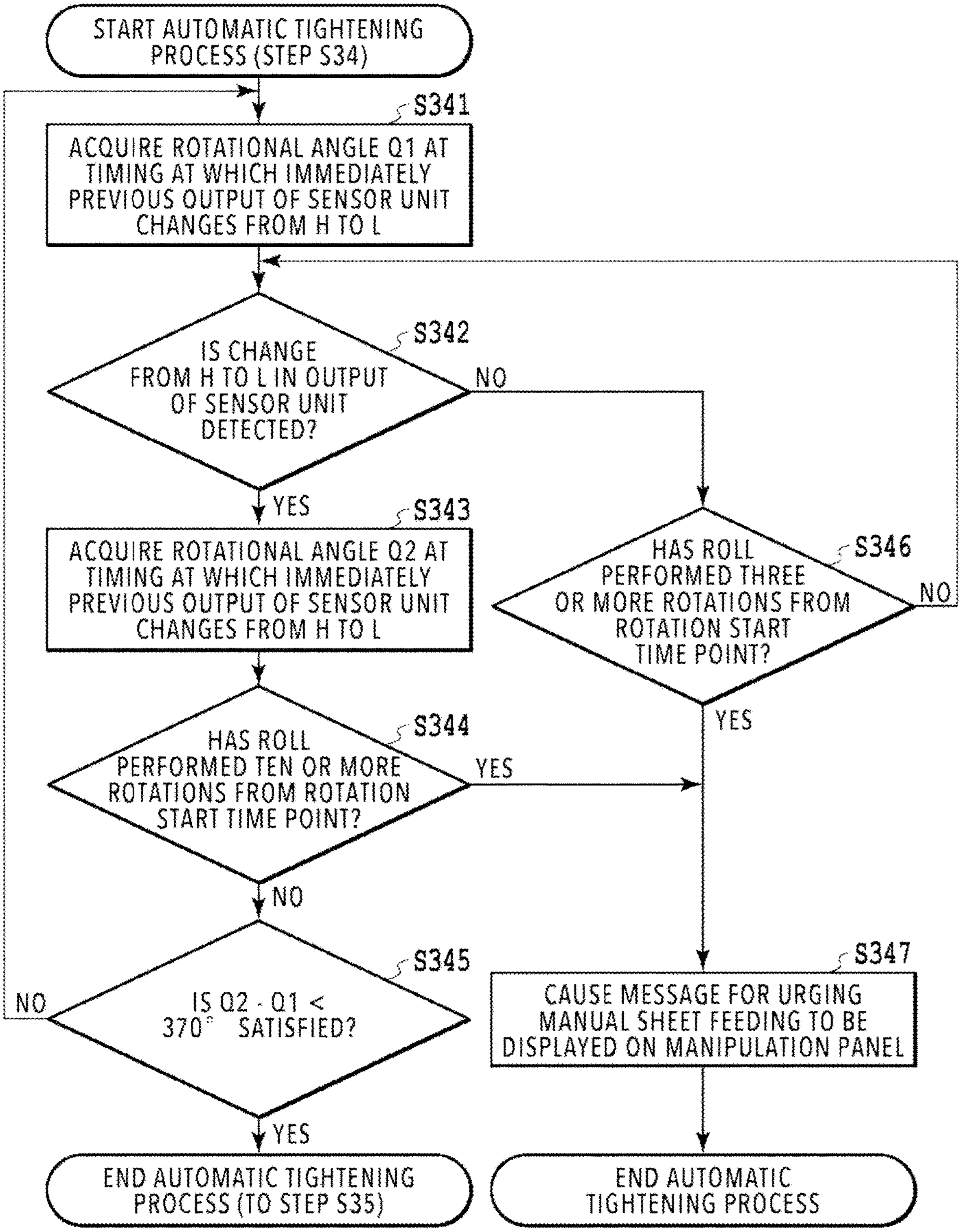
FIG. 10 is a flowchart of an automatic tightening process.

The description returns to the flow of FIG. 10. After step S343, the CPU 201 determines whether or not the roll R has performed ten or more rotations from the rotation start time point (step S344). In a case in which NO is determined in step S344, the process proceeds to step S345, whereas in a case in which YES is determined in step S344, the process proceeds to step S347. A threshold value of the number of rotations used for the determination criterion in step S344 may be set arbitrarily.

In a case in which NO is determined in step S344, the CPU 201 determines whether or not Q2−Q1<370° is satisfied (step S345) using Q1 acquired in step S341 and Q2 acquired in step S343. In a case in which YES is determined in step S345, the roll R is determined not to be loose, the automatic tightening process ends, and the process proceeds to step S35 of FIG. 8. On the other hand, in a case in which NO is determined in step S345, the process returns to step S341, and the automatic tightening process continues.

Next, a case in which the change from the H level to the L level in the output of the sensor unit 6 is not detected (NO in step S342) will be described. In this case, the CPU 201 determines whether or not the roll R has performed three or more rotations from the rotation start time point (step S346). In a case in which YES is determined in step S346, the process proceeds to step S347, whereas in a case in which NO is determined, the process returns to step S342. Here, the threshold value of the number of rotations used for the determination criterion in step S346 may be set arbitrarily.

In a case in which YES is determined in step S344 or step S346, the CPU 201 stops the automatic tightening process, causes a message for prompting the user to perform the manual sheet feeding to be displayed on the manipulation panel 28 (step S347), and ends a series of processes. The content of the automatic tightening process according to the present embodiment has been described above.

In the present embodiment, the leading end of the sheet is detected twice or more, and the roll is caused to rotate in the opposite direction until a phase difference thereof becomes less than a certain value (until the detection cycle falls within a predetermined allowable range), and thus the loose roll can be automatically tightly wound. Accordingly, the user need not tightly wind the loose roll with his/her own hand. Accordingly, the convenience in the case of setting the roll is improved. Further, the roll is caused to rotate in the forward direction after the tightly winding operation, and thus it is possible to reliably guide the leading end portion of the sheet to the sheet feeding opening, leading to an improvement in the reliability of the automatic sheet feeding.

Modified Example

As the sensor unit 6, a distance sensor other than an optical sensor can be used as long as the sensor has an output value changing according to a distance to the sheet. For example, a distance sensor such as an ultrasonic sensor or an electrostatic sensor that detects the distance to the object in a non-contact manner can be used.

The printing apparatus is not limited to the configuration including the two sheet supplying apparatuses corresponding to the two roll sheets and may be a configuration including one sheet supplying apparatus or three or more sheet supplying apparatuses. Further, the printing apparatus is not limited to only the inkjet printing apparatus as long as an image can be printed on a sheet supplied from the sheet supplying apparatus. Further, the printing system and configuration of the printing apparatus are arbitrary as well. For example, a serial scan system of repeating scanning of the print head and the sheet conveyance operation and printing an image or a full-line system of continuously conveying a sheet to a position opposite to a long print head and printing an image may be employed.

Further, the present invention can be applied to various sheet supplying apparatuses in addition to the sheet supplying apparatus which supplies sheets serving as print medium to the printing apparatus. For example, the present invention can be applied to an apparatus that supplies a reading target sheet to a reading apparatus such as a scanner or a copying machine, or an apparatus that supplies a sheet-like processing material to a processing apparatus such as a cutting apparatus. Such a sheet supplying apparatus may be configured separately from an apparatus such as the printing apparatus, the reading apparatus, or the processing apparatus and may include a control unit (CPU) for the sheet supplying apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, the roll set by the user is tightened by the apparatus, and its looseness is eliminated. Accordingly, the work load of the user is reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-046418 filed Mar. 10, 2017, which is hereby incorporated by reference herein in its entirety.

What is claimed is:

1. A printing apparatus, comprising:
- a printing unit configured to perform printing on a sheet supplied from a roll sheet;
- a driving unit configured to rotate the roll sheet in a first direction to supply the sheet to the printing unit and a second direction opposite to the first direction; and
- a detecting unit configured to detect the sheet separated from an outer circumference of the roll sheet,
- an acquiring unit configured to acquire a rotational angle of the roll sheet, and
- a display unit configured to display a message for urging a user to perform a manual sheet feeding in a case that the detecting unit cannot detect the sheet of the roll sheet rotating in the second direction.

2. The printing apparatus according to claim 1, wherein in a case in which the detecting unit detects the sheet while the roll sheet is rotated by the driving unit in the second direction, the driving unit rotates the roll sheet in the first direction.

3. The printing apparatus according to claim 2, wherein in a case in which a first rotational angle acquired by the acquiring unit at the time of detection of the sheet by the detecting unit and a second rotational angle acquired by the acquiring unit at the time of subsequent detection of the sheet by the detecting unit are equal to or less than a predetermined value, the driving unit rotates the roll sheet in the first direction.

4. The printing apparatus according to claim 1, further comprising a holding unit configured to rotatably hold the roll sheet in a predetermined position.

5. The printing apparatus according to claim 4, further comprising:
- a sensor configured to detect setting of the holding unit, wherein
- after the sensor detects the setting of the holding unit, the driving unit rotates the roll sheet in the second direction.

6. The printing apparatus according to claim 4, wherein the holding unit is provided in upper and lower stages.

7. The printing apparatus according to claim 1, wherein the user can input a size of the sheet through the display unit.

8. The printing apparatus according to claim 1, wherein before the message is displayed on the display unit, the roll sheet rotates three or more rotations in the second direction.

9. The printing apparatus according to claim 1, further comprising:

a guide unit configured to guide from below the sheet supplied from the roll sheet to the printing unit; and a contact unit supported by the guide unit and in contact with the outer circumference of the roll sheet rotating in the second direction.

10. The printing apparatus according to claim 9, wherein the detecting unit is provided on the guide unit.

11. The printing apparatus according to claim 1, wherein the printing unit comprises an ejection unit configured to eject ink while moving in a direction intersecting with a conveyance direction of the sheet.

12. The printing apparatus according to claim 1, wherein the printing unit comprises a full line print head configured to eject ink while the sheet is continuously conveyed.

* * * * *